United States Patent [19]

Lussier et al.

[11] Patent Number: 4,836,913
[45] Date of Patent: Jun. 6, 1989

[54] CATALYTIC CRACKING PROCESS EXPLOYING A ZEOLITE AS CATALYSTS AND CATALYST SUPPORTS

[75] Inventors: Roger J. Lussier, Ellicott City; George J. Surland, Woodbine, both of Md.

[73] Assignee: W. R. Grace & Co.-Conn., New York, N.Y.

[21] Appl. No.: 172,675

[22] Filed: Mar. 24, 1988

Related U.S. Application Data

[60] Division of Ser. No. 802,542, Nov. 27, 1985, Pat. No. 4,749,672, Continuation-in-part of Ser. No. 657,858, Oct. 5, 1984, abandoned, Continuation-in-part of Ser. No. 484,435, Apr. 13, 1983, abandoned.

[51] Int. Cl.$^4$ .............................................. C10G 11/05
[52] U.S. Cl. ..................................... 208/120; 208/118; 208/121; 208/122; 208/149; 502/68; 502/80; 502/524

[58] Field of Search ............... 208/120, 118, 121, 122, 208/149; 502/68, 80, 524

[56] References Cited

U.S. PATENT DOCUMENTS

| | | | |
|---|---|---|---|
| 3,506,594 | 4/1970 | Haden et al. | 502/68 |
| 3,867,308 | 2/1975 | Elliott | 502/68 |
| 3,883,444 | 5/1975 | Maselli et al. | 423/213.5 |
| 3,932,268 | 1/1976 | Haden et al. | 208/120 |
| 4,235,753 | 11/1980 | Brown et al. | 423/328 |
| 4,608,357 | 8/1986 | Silverman et al. | 502/84 |
| 4,749,672 | 6/1988 | Lussier et al. | 502/68 |

FOREIGN PATENT DOCUMENTS 0967136  3/1975  Canada ................................. 502/68

Primary Examiner—Anthony McFarlane
Attorney, Agent, or Firm—Arthur P. Savage

[57] ABSTRACT

Catalysts which comprise or contain caustic leached spinel/mullite are found to possess a particularly high activity and stability for the catalytic conversion of hydrocarbons.

10 Claims, No Drawings

CATALYTIC CRACKING PROCESS EXPLOYING A ZEOLITE AS CATALYSTS AND CATALYST SUPPORTS

This is a division of application Ser. No. 802,542, filed Nov. 27, 1985, which is a continuation-in-part of U.S. Ser. No. 657,858 filed Oct. 5, 1984, now abandoned, which is a continuation-in-part of U.S. Ser. No. 484,435 filed Apr. 13, 1983, now abandoned.

This application is a continuation-in-part of U.S. Ser. No. 657,858 filed Oct. 5, 1984 which is a continuation-in-part of U.S. Ser. No. 484,435, filed Apr. 13, 1983, now abandoned.

The present invention relates to the preparation of catalyst supports and catalysts used for the conversion of hydrocarbons, and more particularly to the preparation of hydrocarbon cracking and hydroprocessing catalysts that are particularly effective for the processing of residual hydrocarbon feedstocks.

Catalysts which are used for the conversion of hydrocarbons typically comprise particulate inorganic oxide supports combined with catalytically active metals and/or crystalline zeolites. Hydroprocessing catalysts generally contain Group VI and/or Group VIII metals combined with a formed support component which comprises alumina or silica-alumina. Cracking catalysts comprise crystalline zeolites such as Type Y faujasite or ZSM zeolites which are prepared by combining the crystalline zeolite in finely divided form with an appropriate inorganic oxide matrix which comprises silica, alumina and/or clay. Clay, due to its low cost and availability, is a particularly attractive raw material for the preparation of catalysts.

U.S. Pat. No. 2,939,764 describes a method for preparing artificial bauxite wherein kaolin clay is calcined at a temperature of about 900° to 1000° C. and then treated with sodium hydroxide solution to leach or remove silica as a soluble sodium silicate.

U.S. Pat. No. 3,932,268 describes fluid cracking catalysts which comprise an ion exchanged faujasite type Y zeolite and an amorphous matrix wherein the matrix comprises the alumina-silica residue of caustic leached kaolin clay. The zeolite component is prepared in situ within a preformed calcined clay particle by the treatment of calcined kaolin microspheres with caustic. The remaining alumina-silica residue which is not converted to zeolite remains and serves as a catalyst matrix.

U.S. Pat. No. 4,235,753 describes a method for preparing shaped crystalline aluminisilicate containing particles wherein calcined clay particles are reacted in an aqueous alkaline medium which contains aluminosilicate nucleation centers.

Brindley and Nakahira in Journal of the American Ceramic Society, Vol. 42, No. 7, pp. 319 to 323 (1959) disclose that kaolinite is converted to a spinel-type phase when heated to about 925° to 950° C. which subsequently is progressively converted to mullite when heated to about 1050° to 1100° C.

In recent years the refining industry has been processing increasing amounts of metal containing residual hydrocarbon feedstocks. The metal, primarily vanadia and nickel, tend to deactivate catalysts, and thereby increase the overall cost of processing residual feedstocks. Accordingly, a significant requirement exists for hydrocarbon conversion catalysts which are resistant to the deactivating effects of vanadia and nickel and which may be prepared from readily available inexpensive raw materials such as kaolin.

It is therefore an object of the present invention to provide improved hydrocarbon conversion catalysts and catalyst components.

It is another object to provide cracking catalysts which are active for the conversion of residual hydrocarbon feedstocks to valuable lower molecular weight products such as gasoline and diesel fuel.

It is another object to provide hydroconversion catalysts and catalyst supports which are economical to prepare on a commercial scale and which are particularly resistant to the deactivating effects of metals contained in residual type feedstocks.

These, and still further objects of the present invention will become readily apparent to one skilled in the art from the following detailed description and specific examples.

Broadly, our invention contemplates catalysts, catalyst components, and catalyst supports which contain or comprise caustic leached spinel compositions which may contain substantial quantities of mullite.

More specifically, we have found that valuable catalysts and catalyst components may be prepared from a caustic leached spinel and mullite (hereinafter frequently referred to as CLS/mullite) which has a high concentration of acid sites that are resistant to hydrothermal deactivation.

The preparation of calcined leached kaolin clays (including spinels) is generally disclosed in the prior art. However, the CLS/mullite used in the practice of the present invention is particularly characterized by the ability to retain a high degree of catalytic activity as measured by acid-site stability, i.e. retention of acid-sites subsequent to hydrothermal treatment. This high degree of stability is obtained by careful control of the caustic leaching conditions, and in particular it is found that where the spinel (calcined kaolin) is leached (reacted with sodium hydroxide solution) for a period in excess of about 6 hours, a substantial amount of hydrothermal stability is lost. Accordingly, the CLS/mullite contemplated for use in the present invention is obtained by the following process.

(1) Kaolin, which has the general composition $2.0SiO_2:Al_2O_3:0.01$ to $0.10MO:H_2O$ wherein Mo represents metal oxides such as iron and titanium, is heated to a temperature of about 900° to 1300° C. for about one-tenth to 6 hours to obtain a reactive spinel/mullite type compound having a spinel to mullite mole ratio of from about 1:0 to about 1:0.5. Temperatures of from about 900° to 1050° C. results in the formation of a composition which is essentially 100% spinel, whereas temperatures of 1250° to 1300° C. result in the formation of compositions which contain up to 50% mullite. Calcination temperatures of 900° to 1200° result in the preferred spinel-mullite composition in which the spinel phase comprises 50 to 100 mole percent of the composition and the mullite phase comprises 0 to 50 mole percent.

TABLE A

Comparison of Lattice Spacings and Lattice Parameters of the Spinel-Type Phase from Kaolinite and of Gamma Alumina[1]

| hkl | Inten-sity[2] | Spinel-type phase (1) | Spinel-type phase (2) | Gamma Alumina (1) | Gamma Alumina (2) |
|---|---|---|---|---|---|
| 400 | S | 1.971(7.884) | 1.973(7.892) | 1.976(7.904) | 1.977(7.908) |
| 440 | VS | 1.394(7.885) | 1.394(7.885) | 1.397(7.900) | 1.398(7.906) |
| 444 | W | 1.138(7.884) | | 1.141(7.905) | |
| 731 | W | | | 1.030(7.911) | |

TABLE A-continued

Comparison of Lattice Spacings and
Lattice Parameters of the Spinel-Type
Phase from Kaolinite and of Gamma Alumina[1]

| hkl | Intensity[2] | Spinel-type phase (1) | (2) | Gamma Alumina (1) | (2) |
|-----|------|------|------|------|------|
| 800 | VW | | | 0.9879(7.903) | |
| 840 | VW | | | 0.8845(7.910) | |

[1] G. W. Brindley and M. Nakahira, "III, The High Temperature Phase," J. AM. Ceram. Soc., 42(7), 319-24.
[2] S = strong, VS = very strong, W = weak, VW = very weak.
[3] Kaolinite calcined at 950° C.

If the composition is mostly in the silica-alumina spiral form the X-ray diffraction pattern of the compositions is similar to that described by Brindley and Nakahira as shown in Table A. If calcined at a higher temperature the compositions may contain a high level of mullite. Typical X-ray patterns (using only the strongest peaks) for these materials are shown in Table B:

TABLE B

| SiO$_2$—Al$_2$O$_3$ Spinel | | Mullite | |
|------|------|------|------|
| 2 Q | Intensity | 2 Q | Intensity |
| 45.8 | 10 | 26.0 | 10 |
| 67.3 | 10 | 40.8 | 8 |
| 37.3 | 6 | 60.4 | 8 |
| 39.5 | 6 | | |
| 46.5 | 6 | | |

(2) The reactive spinel/mullite obtained in step (1) is then combined with an alkali metal hydroxide solution, preferably sodium hydroxide solution in amounts which provide a spinel-mullite/NaOH/H$_2$O reaction mixture having the following weight ratio ranges: 50 to 100 g spinel-mullite:1.0 to 60 g NaOH:65 to 1000 g H$_2$O.

(3) The reaction mixture of step (2) is then heated at a temperature of about 50° to 100° C. for a period of one-quarter to 6 hours to extract (leach) from about 5 to 75 weight percent of the silica from the spinel as soluble sodium silicate.

(4) Subsequent to heating in step (3), the caustic leached spinel (CLS)/mullite is recovered by filtration and is washed with water and exchanged with mineral acids, ammonium or rare earth salts to remove Na+ and obtain a finely divided particulate CLS/mullite which has a silica to alumina mole ratio of from about 0.50 to 1.7, a nitrogen pore volume of 0.25 to 0.70, and an average pore diameter of from 50 to 100 Å, and an x-ray diffraction pattern very similar to gamma alumina.

Depending on the time and temperature of the initial calcination, varying amounts, i.e. 0 to 100% and preferably 0 to 50%, of the spinel may be converted to mullite, as determined by crystalographic X-ray diffraction analysis. As long as the calcination conditions (i.e. time, temperature) are such that the silica removed from the structure does not crystallize, a high surface area product which contains less than 0.20% Na$_2$O is prepared. Since mullite is formed and decomposes at a higher temperature than the spinel phase, substantial conversion, ie. 10 to 50%, to mullite would be advantageous for use under severe process conditions.

To determine whether the CLS/mullite possesses the desired acid site concentration, a sample of CLS is subjected to temperature programmed desorption, using tertiary butyl amine, which is described as follows.

About 100 mg of catalyst is pretreated at 380° C. in flowing helium (He) (110 cc/min.) for one and one-half hours. After cooling to room temperature in flowing He, the catalyst is exposed to a He carrier stream (80 cc/min.) which passes through a tertiary butyl ammonium (TBA) saturator maintained at ice-water temperature until breakthrough of TBA is detected by a thermal conductivity (TC) cell. Excess TBA is then swept from the catalyst surface in flowing He and is assumed to be eluted when the TC response returns to baseline (about 5 minutes). The catalyst is then heated using a 12° C./min. rate to 380° C. in a flow of He (80 cc/min.). The resulting chromatogram consists of two (2) desorption peaks: a low temperature alpha peak associated with physisorbed TBA, and a high temperature beta peak associated with chemisorbed TBA. The area of the beta peak is a measure of the amount of "strong" acidity; the temperature of the beta peak maximum is an index of acid site strength. Planimetered beta peak areas, corrected to a dry basis using loss on ignition at 954° C., were employed in the calculation of total strong acidity and acid site density.

To establish the resistance to hydrothermal degradation of the acid site content, i.e. stability, samples of CLS/mullite are typically heated to a temperature of 732° to 843° C. in the presence of saturated steam for a period of 5 to 12 hours. The acid site concentration is determined both prior and subsequent to hydrothermal deactivation, and it is found that the preferred CLS/mullite used in the practice of the present invention will retain at least about 70 percent of the acid-sites, and preferably from about 70 to 95 percent of the initial acid sites.

As indicated above, the CLS/mullite of the present invention is advantageously used in the preparation of hydrocarbon conversion catalysts and catalyst supports. In a preferred practice of the invention, the CLS/mullite is included as a component of fluid cracking catalysts (FCC) which comprises a zeolite such as type Y faujasite or ZSM zeo;lite, an inorganic oxide binder, such as silica alumina, silica alumina sols and hydrogels, the preparation of which are generally described in the following patents: U.S. Pat. Nos. 3,957,689, 3,912,619, 3,650,988, 4,144,194, and Canadian No. 967,136. Zeolites which may be included in the catalyst compositions are described in U.S. Pat. Nos. 3,293,192, 3,449,070, 3,402,996, 3,607,043, 3,676,368, 3,639,099, 3,808,326 and 4,164,551.

The techniques described in the aforesaid patents may be used in the preparation of catalysts including cracking catalysts which contain the CLS/mullite of the present invention. In a particularly preferred catalyst, the CLS/mullite is combined with a rare earth exchanged type Y zeolite, an alumina sol binder, and from about 20 to 80 parts by weight kaolin clay. Using the technique described in Canadian Pat. No. 967,136, catalysts which contain from about 5 to 50 weight percent zeolite, from about 10 to 20 percent alumina sol binder, from about 5 to 80 percent by weight CLS/mullite, from about 0 to 80 percent by weight kaolin clay are found to be particularly effective for the conversion of residual type hydrocarbons which contain substantial quantities of nickel and vanadium; sulfur and/or nitrogen.

In addition to using the CLS/mullite contemplated herein as a component for fluid cracking catalysts, it is also contemplated that the CLS/mullite may be formed into particles having a desired shape and size which are useful for the preparation of hydroprocessing catalysts. Typically, the CLS/mullite is formed using conventional extrusion, pilling, granulation, or sphere-forming techniques.

The hydroprocessing catalyst supports obtained using the CLS/mullite either alone or in combination (about 5 minutes) at 2000° F. Surface area of the caustic leached product is also dependent on caustic level, with increasing caustic level giving greater $SiO_2$ removal and hence increased surface areas.

TABLE I

Effect of Clay Calcination Temperature and Time on Caustic Leached Spinel

| Sample No. | Clay Calcination | Time at Reflux (Hrs.) | Caustic Leach Conditions (g NaOH/g Clay/g H₂O) | Surface Area (m²/g) | 1750° F. on Exotherm |
|---|---|---|---|---|---|
| 1 | 3 hrs. @ 1350° F. | 2 | 0.27/1/4.0 | 4 | Yes |
| 2 | ½hr. @ 1650° F. | 2 | 0127/1/4.0 | 23 | Yes |
| 3 | 1 hr. @ 1700° F. | 2 | 0.27/1/4.0 | 18 | Yes |
| 4 | ¼hr. @ 1800° F. | 2 | 0.23/1.4.0 | 46 | Yes |
| 5 | ½hr. @ 1800° F. | 2 | 0.23/1/4.0 | 85 | Sma |
| 6 | ¾hr. @ 1800° F. | 2 | 0.23/1/4.0 | 125 | None |
| 7 | 1 hr. @ 1800° F. | 2 | 0.23/1/4.0 | 108 | None |
| 8 | 1½hrs. @ 1800° F. | 2 | 0.23/1/4.0 | 127 | None |
| 9 | 1 hr. @ 1800° F. | 2 | 0.63/1/4.0 | 204 | None |
| 10 | 2 hrs. @ 1800° F. | 1 | 0.63/1/4.0 | 312 | None |
| 11 | 4 hrs. @ 1800° F. | 1 | 0.63/1/4.0 | 279 | None |
| 12 | 6 hrs. @ 1800° F. | 1 | 0.63/1/4.0 | 263 | None | with alumina and/or silica-alumina sols and gels, typically will possess the following characteristics: a surface area of 150 to 350 m²/g; a total pore volume 0.30 to 1.00 cc/g; a pore volume distribution wherein 0 to 0.1 cc/g is pores less than 20 Å in diameter, 0.20 to 0.60 cc/g in pores less than 100 Å in diameter, 0.05 to 0.20 cc/g in pores from 100 to 1000 Å in diameter, and 0.10 to 0.50 cc/g in pores greater than 1000 Å in diameter. The formed CLS/mullite-comprising particles may have particle size ranging from about 0.5 to 10 mm. In a particularly preferred form, the CLS/mullite is formed into spheres having a size as small as 0.5 to a size as large as 4 mm.

The hydroprocessing catalysts which may be obtained using the CLS/mullite supports of the present invention typically contain promoter metals selected from Group VI and Group VIII of the Periodic Table. In particular, it is found that metals such as cobalt, moly, nickel and tungsten, which are incorporated in the catalyst in amounts ranging from 0.5 to as much as 20 percent by weight are particularly effective for the hydroprocessing of residual type hydrocarbon feedstocks. Typically, these feedstocks, which contain substantial quantities of nickel and vanadia as well as sulfur and nitrogen, may be demetallized, desulfurized and/or denitrogenized using the catalysts contemplated herein. Conventional techniques for demetallization as well as desulfurization and denitrogenation involve treatment of the feedstock with hydrogen at pressure of 10 to 700 atm and temperatures of 300° to 600° C. in the presence of the catalyst described herein.

Having described the basic aspects of the present invention, the following examples are given to illustrate specific embodiments thereof.

EXAMPLE 1

This example shows that the starting kaolin must be calcined under conditions such that the 1750° F. exotherm observed in a DTA (differential thermal analysis) of kaolin is substantially reduced or eliminated. Samples of kaolin clay were heat treated for the time and temperature indicated in Table I. The samples were then aged at 100° C. under reflux or in sealed teflon bottles for the indicated time using different levels of NaOH. Calcined samples which still exhibited a substantial exotherm at about 1750° F. were not reactive as indicated by the low surface areas. The conversion of metakaolin to the spinel-like phase occurs fairly slowly at 1700° F. (about 2 hours or more), but is quite rapid

EXAMPLE 2

This example shows the higher caustic levels with less water produces a somewhat higher surface area caustic leached spinel. Kaolin clay was calcined for 1 hour at 1800° F. and then added to sodium hydroxide solutions at weight ratios given in Table II. After 2 hours of boiling under reflux the slurries were filtered and then washed on the filter twice with 5 g hot deionized water per g of starting clay. Thirty g of each of these products was then exchanged 3 times with 15 g ammonium sulfate in 300 g water. After each exchange the product was washed with hot deionized water, and oven dried. As shown by the data, even the lower surface area materials have substantial cracking activity after hydrothermal deactivation.

TABLE II

Effect of Caustic and Water Level on Caustic Leached Spinel Product

| Sample No. | Caustic Leach Conditions (g NaOH/g Clay/g H₂O) | Surface Area, m²/g | MA[1] |
|---|---|---|---|
| 1 | 0.36/1/2.7 | 137 | 59 |
| 2 | 0.36/1/3.4 | 108 | 40 |
| 3 | 0.45/1/2.7 | 152 | 51 |
| 4 | 0.45/1/3.4 | 130 | 54 |
| 5 | 0.63/1/2.7 | 204 | 55 |
| 6 | 0.63/1/3.4 | 181 | 54 |

[1]Microactivity at 930° F., 16 WHSV, 3 C/O after an 8 hour, 1350° F., 100% steam treatment on West Texas Heavy Gas Oil, volume % conversion.

EXAMPLE 3

This example shows that sodium ($Na_2O$) can be substantially eliminated from the caustic leached spinel by reaction with dilute sulfuric acid without substantial loss in alumina content of the product. 250 g of kaolin clay (calcined 1 hour at 1800° F.) was added to 675 ml $H_2O$ containing 157 g NaOH and boiled one-half hour under reflux. The slurry was filtered and the caustic leached product was washed with hot deionized $H_2O$. After this wash the filter cake has about 4.5–5.5% $Na_2O$ and 76 weight % $Al_2O_3$. Samples of the above filter cake, equivalent to 50 g of the original calcined clay were reslurried in 200 ml solution of varying $H_2SO_4$ concentration for one-half hour at approximately 150° F., filtered and washed with hot deionized $H_2O$. The data in Table III indicate that most of the $Na_2O$ can be removed without substantial loss in the $Al_2O_3$ content of the caustic leached product.

TABLE III

Effect of Acid Level on $Na_2O$ Removal in Caustic Leached Spinel

| Sample No. | Acid Reslurry Conditions | wt. % $Na_2O$ | wt. % $Al_2O_3$ |
|---|---|---|---|
| 1 | 200 ml 0.50 M $H_2SO_4$/50 g original spinel | 0.093 | 72.56 |
| 2 | 200 ml 0.40 M $H_2SO_4$/50 g original spinel | 0.12 | 73.69 |
| 3 | 200 ml 0.30 M $H_2SO_4$/50 g original spinel | 0.052 | 73.84 |
| 4 | 200 ml 0.20 M $H_2SO_4$/50 g original spinel | 0.038 | 74.87 |
| 5 | 200 ml 0.10 M $H_2SO_4$/50 g original spinel | 1.14 | 76.23 |

EXAMPLE 4

This example shows the catalytic cracking activity which is retained by the CLS after thermal and hydrothermal deactivation. The data in Table IV indicates the caustic leached spinel, prepared as described below, loses little or no catalytic activity after a two hour 1800° F. thermal treatment or a 1550° F., 5 hour, 100% steam deactivation. It is noted for comparative purposes that an all-synthetic 25% $Al_2O_3$ silica alumina cracking catalyst has a typical MA of about 27 after a 2 hour, 1800° F. thermal treatment. This sample was prepared by addition of 600 g kaolin clay (calcined 1 hour at 1800° F.) to a solution of 376.8 g NaOH in 1.62 liters deionized $H_2O$. After boiling 1 hour under reflux, the caustic leached spinel was filtered, and washed 3 times with 1.0 liters hot deionized $H_2O$. The filter cake was redispersed in 2.5 liters 1M $H_2SO_4$, filtered, washed on the filter 3 times with 2.0 liters hot deionized $H_2O$ and dried at 250° F. The dried product was crushed through a 30 mesh screen and then given the indicated thermal or hydrothermal treatments.

TABLE IV

Catalytic Cracking Activity of Caustic Leached Spinel

| Sample No. | Deactivation Pre-Treatment | MA[1] |
|---|---|---|
| 1 | 2 hrs. @ 1250° F. | 58.0 |
| 2 | 2 hrs. @ 1400° F. | 66.9 |
| 3 | 2 hrs. @ 1500° F. | 55.5 |
| 4 | 2 hrs. @ 1600° F. | 63.2 |
| 5 | 2 hrs. @ 1800° F. | 66.0 |
| 6 | 5 hrs. @ 1500° F., 100% steam | 60.4 |
| 7 | 5 hrs. @ 1550° F., 100% steam | 56.4 |

[1]Microactivity at 930° F., 16 WHSV, 3 C/O after the indicated thermal or hydrothermal treatment, volume % conversion.

EXAMPLE 5

This example shows that commercially calcined clays which do not have a significant exotherm at about 1750° F. as measured by DTA are useful for producing the caustic leached spinel. Table V summarizes data on caustic leaching of various commercially available calcined kaolin clays. For all three samples, leaching with caustic increased alumina content from about 42 to about 70%, and loss of silica from the structure increased the surface area to greater than 300 m²/g. It is believed that these clays are calcined at approximately 1900° F. for about 10 minutes.

TABLE V

Caustic Leaching of Commercially Available Calcined Clays

| Commercial Clay Sample No. | Leach Conditions | SA* | $Al_2O_3$ (wt. %) |
|---|---|---|---|
| 1 | 31.4 g NaOH/50 g clay, 1 hr. at reflux | 452 | 77.62 |
| 2 | 31.4 g NaOH/50 g clay, 1 hr. at reflux | 304 | 75.48 |
| 3 | 31.4 g NaOH/50 g clay, 1 hr. at reflux | 304 | 71.81 |

*SA = Surface Area, m²/g as determined by $N_2$ adsorption.

EXAMPLE 6

This example shows that reflux time can be very brief. 200 g kaolin clay (calcined 1 hour at 1800° F.) was added to 540 ml $H_2O$ containing 125.6 g NaOH and 400 g of the same material also added to 1,080 ml $H_2O$ containing 201.0 g NaOH. The slurries were boiled under reflux with portions removed after the indicated time at reflux. After filtering and washing, these samples were exchanged to low $Na_2O$ with 3 exchanges at 150° F. using 20 g $(NH_4)_2SO_4$ per 50 g clay starting material in 250 ml hot D.I. $h_2O$. After each exchange the product was washed 1 time with 250 ml hot D.I. $H_2O$ and 3X after the third exchange. The results, given in Table IX, indicate very good catalytic cracking activities even at very short reflux times.

TABLE VI

Effect of Short Reflux Time on Surface Area of Caustic Leached Spinel

| Sample No. | Time at Reflux (Hrs.) | g NaOH/G Clay/g $H_2O$[1] | SA[2] | MA[3] |
|---|---|---|---|---|
| 1 | ¼ | 0.5/1.0/2.7 | 190 | 55 |
| 2 | ½ | " | 182 | 54 |
| 3 | ¾ | " | 178 | 52 |
| 4 | 1 | " | 168 | 52 |
| 5 | 1¼ | " | 161 | 55 |
| 6 | 1½ | " | 156 | 52 |
| 7 | ¼ | 0.63/1.0/2.7 | 192 | 46 |
| 8 | ½ | " | 212 | 52 |
| 9 | ¾ | " | 215 | 60 |
| 10 | 1¼ | " | 199 | 58 |
| 11 | 1½ | " | 190 | 55 |

[1]Clay used was kaolin calcined 1 hour at 1800° F.
[2]Surface Area, m²/g.
[3]Microactivity data after $(NH_4)_2SO_4$ exchange to less than 0.1% $Na_2O$ after an 8 hour, 1350° F., 100% steam treatment at 930° F., 16 WHSV, 3 C/O, vol. % conversion.

EXAMPLE 7

This example shows the surface properties of the caustic leached spinal powder. The caustic leached spinel was prepared by adding 100 g kaolin clay (calcined 1 hour at 1800° F.) to 196 ml solution containing 50.4 g potassium hydroxide and hot aging 2 hours in a sealed teflon bottle. The product was filtered, washed 2 times with hot deionized water and oven dried overnight at 250° F. The dried product was exchanged 3 times with 50 g $(NH_4)_2SO_4$ in 500 ml) $H_2O$ for ½ hour at 160° F. The product was washed 1 time with 1 liter hot deionized $H_2O$ after the first and second exchanges, and 3 times with 1.0 liters after the third exchange to remove residual salts.

The data in Table VII summarizes the surface/hydrothermal properties of the caustic leached spinel.

TABLE VII

Surface/Hydrothermal Stability Properties of Caustic Leached Spinel

| Sample N₂ (treatment) | 1 (2 hr. @ 1000° F.) | 2 (8 hr. @ 1350° F. 100% steam) |
|---|---|---|
| SA, total | 182 | 164 |
| Total N₂ PV | 0.756 | 0.780 |
| N₂ PV 600 Å | 0.385 | 0.428 |
| N₂ PV 20-600 Å | 0.371 | 0.352 |
| N₂ PV 20 Å | 0 | 0 |
| SA in 20-100 Å Pores (%) | about 83 | about 81 |

SA = surface area (m²/g)
PV = pore volume (cc/g)
N₂ PV 600 Å = nitrogen pore volume in pores greater than 600 Å in diameter.

EXAMPLE 8

This example describes the use of the caustic leached spinel as an additive to $SiO_2$ sol bound catalysts as disclosed in U.S. Pat. No. 3,867,308, 11,250 g of kaolin was added to a solution of 7,065 g NaOH in 30 liters $H_2O$. The slurry was boiled one hour, filtered, washed twice with 10 gallons hot $H_2O$. After oven drying the solid was reslurried in 30 l 0.50M $H_2SO_4$ for one-quarter hour at 150° F., filtered, washed twice with 10 gallons hot $H_2O$, redispersed in 20 gallons hot $H_2O$, refiltered and oven dried. 750 g dry basis of the above and 900 g $SiO_2$—$Al_2O_3$ basis Na-Y were dispersed in the minimum $H_2O$ in a blender, the pH adjusted to 4.0 using mixed $H_2SO_4$/alum solution and this slurry added to a slurry of 25.3 lbs. pH 3.0 $SiO_2$ sol (about 10% $SiO_2$) and 2200 g dry basis kaolin clay. After mixing the two slurries, the product was spray dried immediately.

EXAMPLE 9

This example describes the use of the caustic leached spinel as an additive to alumina sol bound catalysts. 600 g of low $Na_2O$ (about 0.3 wt.%) calcined rare earth Y zeolite, 650 g of the caustic leached spinel made in a similar manner to that in example 17 were blended together and added to 2,128 g of aluminum chlorhydroxide (23.5% $Al_2O_3$) and 2,300 g dry basis kaolin clay as described in Canadian No. 967,136. The slurry was spray dried and the product calcined 1 hour at 1000° F. This product had good physical properties (Average Bulk Density/CD 0.76/0.81, Davison Index/Jersey Index 21/1.8), and excellent cracking activity (84.1 versus 67.8 for standard commercial catalyst).

EXAMPLE 10

This example shows that when the caustic leached spinel product is reslurried in acidic media, gelation can be brought about by addition of a base. Though gelation does not change the pore structure or cracking activity, it does produce a highly porous gel which filters and washes readily so that soluble salts can be readily removed. Many of the finer caustic leached spinels become peptized and difficult to filter upon reslurrying in acid due to slow filtration or they pass through filter paper. 11,250 g of kaolin was added to 30; l $H_2O$ containing 7,065 g NaOH and boiled 1 hour at constant volume. After filtering and washing twice with 10 gallons hot $H_2O$, the filter cake was reslurried in 30 l 0.75M $H_2SO_4$. A portion was filtered and virtually all the product went through the filter paper. A separate portion of this slurry was treated with 30% $NH_4OH$ to pH 9.5, was filtered and then washed with hot $H_2O$. This product had a surface area of 310 m²/g, % $Al_2O_3$ of 69.84, % $SO_4$ of 0.23 and % $Na_2O$ of 0.12. This sample had a microactivity of 60.9 at 930° F., 16 Weight Hour Space Velocity, 3 C/O after an 8 hour, 1350° F., 100% steam treatment.

EXAMPLE 11

This example shows that the caustic leached spinel has substantial ability to resist deactivation by metals. 500 g kaolin clay was calcined 1 hour at 1800° F., boiled under reflux for 1 and one-quarter hours in 1.35 l $H_2O$ containing 314 g NaOH, filtered, and washed twice with 1.5 l hot $H_2O$. The product was reslurried in 2 l 0.5M $H_2SO_4$ for one-half hour at 150° F., filtered, washed 3 times with one l hot $H_2O$, reslurried in one l pH 9.0 $H_2O$ (adjusted with 14% $NH_3$) for one-half hour, filtered and washed twice with 2 l hot $H_2O$. These samples of the above product were calcined, impregnated with Ni+V in pentane solution and recalcined prior to steam deactivation and activity tests. The results, given in Table XIV, show substantial activity retention even at a high (1%) metals level.

TABLE VIII

Effect of Ni + V on Activity of Caustic Leached Spinel

| Sample No. | Wt. % Ni + V (1 Ni/2 V) | Microactivity[1] |
|---|---|---|
| 1 | 0 | 68.0 |
| 2 | 0.50 | 61.0 |
| 3 | 1.00 | 54.9 |

[1]Microactivity catalytic cracking at 930° F., 16 WHSV, 3 C/O after an 8 hour, 1350° F., 100% steam treatment, volume % conversion.

EXAMPLE 12

This example shows that the caustic leached spinel can be produced with high surface areas at verying alumina content by changing the caustic leaching time. Separate samples of kaolin clay (calcined 1 hour at 1800° F.) were boiled for various amounts of time under reflux at 0.63 g NaOH/g calcined clay/2.7 g $H_2O$. The products were filtered, washed twice with 5 g $H_2O$/g clay, reslurried in 4 ml 0.5M $H_2OSO_4$/g clay for one-half hour at 150° F., filtered, washed twice with 5 g $H_2O$/g clay and oven dried at 250° F. The data in Table XV indicate the caustic leached spinel produced has decreasing amounts of alumina as reflux time is extended, while still maintaining much of the surface area formed after 1 hour at reflux.

TABLE IX

Use of Increased Reflux Time to Reduce $Al_2O_3$ Content in Caustic Leached Spinel

| Sample No. | Time at Reflux (Hrs.) | Wt. % $Al_2O_3$ | Surface Area (m²/g) |
|---|---|---|---|
| 1 | 1 | about 70.0 | about 270 |
| 2 | 4 | 61.1 | 242 |
| 3 | 6 | 59.4 | 265 |
| 4 | 24 | 52.6 | 186 |
| 5 | 48 | 44.8 | 126 |

EXAMPLE 13

Measurement of acidities of various caustic leached spinels (CLS) are summarized in Table X. These measurements were made using temperature programmed desorption with t-butylamine described previously. The results indicate the CLS prepared with a short hot age time retain a greater percentage of acid sites after steaming, i.e. have greater steam stability, than do samples prepared with long reflux times. We do not known why the stability is reduced with longer hot age. However, we observe that longer aging causes readsorption of some of the silicate originally removed from the clay and this may migrate on steam deactivation resulting in blocking (encapsulation) of the acid sites.

TABLE X

Effect of Reflux Time on Stability of Acid Sites in Caustic Leached Spinel

| Time at Reflux (hrs.) | g NaOH/100 g Clay | Acidity/g Fresh | S13.5 | % Retention | % $Al_2O_3$ |
|---|---|---|---|---|---|
| 1 | 10 | 20.6 | 14.6 | 71 | about 50.6 |
| 1 | 15 | 17.5 | 16.2 | 93 | about 54.3 |
| 1 | 44 | 40.3 | 30.2 | 75 | about 70 |
| 6 | 62.8 | 51.6 | 12.2 | 24 | 59.4 |
| 24 | 41 | 29.7 | 15.6 | 52 | 48.0 |

EXAMPLE 14

This example shows that high surface area alumina rich materials can be produced from calcined clays which contain substantial amounts of mullite. Samples of kaolin were calcined for one-half hour at various temperatures and then caustic leached. 25 g of each material was slurried in 62.5 ml water containing 10.25 g sodium hydroxide, boiled under reflux for 1 hour, filtered, wased on the filter twice with 500 ml hot water, reslurried in 200 ml 0.25M $H_2SO_4$ for one-quarter hour at 150° F., filtered, washed twice with 500 ml hot water and oven dried. The data is summarized in Table XI.

TABLE XI

| Sample No. | Calcination Temperature (°F.) | Predominant Phases (X-ray)[2] | Surface Area ($m^2/g$) | % $Al_2O_3$ |
|---|---|---|---|---|
| 1 | 2000 | 90% spinel (gamma alumina-like phase) and 10% mullite | 391 | 74.22 |
| 2 | 2100 | 75% spinel and 25% mullite | 245 | 74.99 |
| 3 | 2200 | 75% mullite and 25% spinel | 108 | 69.24 |

[1]All samples for one-half hour at temperature.
[2]Anatase, quartz were also present as impurities, quantities of spinel and mullite estimated by X-ray diffraction.

EXAMPLE 15

This example describes the preparation of silica sol bound catalysts containing a high level of caustic leached spinel and low zeolite level in order to produce high yields of light cycle oil.

(a) A large preparation of caustic leached spinel (CLS) was prepared by adding 15 Kg of kaolin clay (calcined for about 45 minutes at 1800°–1900° F. in a rotary kiln) to 40 l $H_2O$ containing 6 Kg NaOH. The slurry was hot aged 1 hour at 200° F., filtered, washed one time with 15 gallons hot deionized $H_2O$, reslurried in 20 l $H_2O$, adjusted the pH to 2.75 with 20% $H_2SO_4$, aged 15 minutes at pH 2.75, filtered, washed three times with 15 gallons hot deionized $H_2O$ and saved as a wet cake. The CLS product had the following analysis:

| | |
|---|---|
| Total Volatiles | 55.95 |
| Wt. % $Na_2O$ | 0.067 |
| Wt. % $Al_2O_3$ | 68.51 |
| Surface Area ($m^2/g$) | 276 |
| Nitrogen Pore Volume (cc/g) | 0.37 |

(b) 1,800 g dry basis of the CLS along with 270 g $SiO_2/AL_2O_3$ basis calcined rare earth Y zeolite were dispersed in a blender in sufficient $H_2O$ to give a slurry of approximately 30% by weight solids. This slurry was then milled at a rate of 150 ml/minute, and then added to 33.1 lbs. of a silica sol at pH 3.0. This sol was prepared by pumping together a 12 Wt.% sodium silicate solution along with an acid alum solution (a mixture of 8.4 L of 77.2 g $Al_2O_3$ from aluminum sulfate and 13.2 L of 20 Wt.% $H_2SO_4$) through a mixing point. To the $SiO_2$ sol, (contaning 10 Wt.% $SiO_2$) CLS/zeolite slurry was added 2,430.4 g. dry basis kaolin clay, the slurry homogenized briefly by recirculation through a pump and then spray dried. 1 Kg of spray dried product was reslurried in 3.75 l $H_2O$ and filtered, the filter cake washed three times with 1 l 3% $(NH_4)_2SO_4$ solution. The filter cake was then reslurried in 3.0 l $H_2O$ at approximately 70° C., filtered, rinsed on the filter with 1 l 70° C. $H_2O$ three times and oven dried overnight at 120° C. (Catalyst I). A second preparation (Catalyst II) was made using the same silica sol and calcined rare earth zeolite but increased level of CLS and reduced level of kaolin clay. The physical properties of these preparations are summarized in Table I and indicate these preparations have excellent density and attrition resistance.

(c) Microactivity results, summarized in Table XII indicated that Catalyst I and II have excellent coke selectivity, gasoline+distillate yields and light cycle oil yields greater than a silica sol bound catalyst containing only rare earth Y and kaolin (Catalyst III) and approximately the same as a $SiO_2$—MgO+CREY catalyst known to be a good light cycle oil producer (Catalyst IV).

TABLE XII

| | $SiO_2$ Sol Bound CLS/Zeolite Catalysts[1] | |
|---|---|---|
| | Catalyst I | Catalyst II |
| Composition | 25% $SiO_2$ Sol | 25% $SiO_2$ Sol |
| | 4.5% Calcined Rare Earth Y | 4.5% Calcined Rare Earth Y |
| | 30% CLS | 45% CLS |
| | 40.5% Kaolin Clay | 25.5% Kaolin Clay |
| Total Volatiles (Wt %) | 4.5 | 4.5 |
| $Na_2O$ (Wt. %) | 0.9 | 0.06 |
| $SO_4$ (Wt. %) | 0.27 | 0.24 |
| Average Bulk Density Index (g/cc) | 0.90 | 0.83 |
| Davison Index/Jersey Index | 6/0.5 | 10/0.8 |
| SA ($m^2/g$) | 113 | 133 |

| Microactivity Comparison of $SiO_2$ Sol Bound CLS/Zeolite Catalysts | | | |
|---|---|---|---|
| Catalyst I | Catalyst II | Catalyst III | Catalyst IV |
| Composition 25% $SiO_2$ Sol | 25% $SiO_2$ Sol | 66.9% $SiO_2$—MgO | 20% $SiO_2$ Sol |
| (Wt %) 4.5% Calcined Rey | 4.5% Calcined REY | 4.5% Calcined REY | 17% REY |

TABLE XII-continued

|  | 30% Caustic Leached Clay 40.5% Kaolin Clay | 45% Caustic Leached Clay 25.5% Clay | 28.6% Kaolin Clay | 63% Kaolin Clay |
|---|---|---|---|---|
| Microactivity Test Conditions: | 500° C., 16 WHSV, 3 c/o on WTHGO after an 8 hour, 732° C., 100% steam deactivation. | | | |
| Conversion (Vol. %) | 63.51 | 66.4 | 63.6 | 65.7 |
| $H_2$ (W %) | 0.087 | 0.094 | 0.081 | 0.042 |
| Total $C_1 + C_2$ (W %) | 0.95 | 1.00 | 1.86 | 1.46 |
| Total $C_3$ (%) | 5.7 | 6.1 | 5.2 | 6.3 |
| Total $C_4$ (Wt %) | 7.9 | 8.7 | 8.2 | 7.9 |
| $C_5$+ Gaso. (%) | 60.5 | 61.8 | 57.9 | 57.2 |
| Light Cycle Oil (%) | 16.9 | 17.4 | 17.6 | 13.0 |
| Total Gasoline Distillate (%) | 77.4 | 79.2 | 75.6 | 70.3 |
| 640° F. + Bottoms (%) | 19.6 | 16.2 | 18.8 | 5.6 |
| Coke (W % of Feed) | 1.4 | 1.7 | 2.5 | 1.92 |
| Coke/Kinetic Conversion | 0.80 | 0.86 | 1.43 | |

[1]Samples pretreated for 2 hours at 1000° F. prior to analysis

EXAMPLE 16

This example shows that addition of CLS to a silica sol bound catalyst allows reduction in usage of a low activity, and costly ultrastable zeolite, i.e. Z14US as described in U.S. Pat. Nos. 3,293,192 and 3,449,070.

(a) 2.4 Kg of a CLS (prepared as described in Example 15) and 1.6 Kg (dry basis) of ultrastable Y were dispersed in a blender at 30% solids and sandmilled together at 150 ml/min. This slurry was added to a pH 3.0 silica sol (2.0 Kg $SiO_2$ basis), 2.0 Kg kaolin clay added, the slurry mixed briefly and spray dried. This sample was exchanged to low $Na_2O$ by the same procedure used in Example 15.

(b) Microactivity results on this sample are compared in Table XIII to a preparation containing twice as much ultrastable Y zeolite and exchanged in the same manner. This sample with the caustic leached calcined clay had similar activity and coke yield compared to the base catalyst, but much improved bottom (feed boiling above 482° C.) conversion. This improved heavy ends conversion is useful where resids or other heavy, high molecular weight feeds are used. The increased $H_2$ yield may be an indication of increased olefin production which could indicate a higher octane gasoline.

TABLE XIII

Microactivity Comparison of $SiO_2$ Sol Bound Ultrastable Y With/Without CLS

|  | Catalyst I | Catalyst II |
|---|---|---|
| Composition (Wt %) | 25% $SiO_2$ Sol 20% Ultrastable Y 30% Caustic Leached Clay 25% Kaolin Clay | 25% $SiO_2$ Sol 40% Ultrastable Y 35% Kaolin Clay |
| Conversion (Vol. %) | 64.8 | 64.1 |
| $H_2$ (W %) | 0.107 | 0.054 |
| Coke (W % Feed) | 1.58 | 1.43 |
| Total Conversion (W %) | 74.2 | 77.4 |
| % 482° C. + Conv. | 93.2 | 90.0 |

Microactivity Test Conditions 500° C., 16 WHSV, 3 c/o on a West Texas Heavy Gas Oil after an 8 hour, 732° C., 100% steam deactivation.

EXAMPLE 17

This example shows that addition of CLS to a silica sol bound catalyst enhances tolerance to vanadium deactivation.

(a) Samples of catalyst were prepared by milling a 30 Wt % solids slurry of calcined rare earth Y or calcined rare earth Y with caustic leached calcined clay, adding this to a silica sol prepared as in Example 15, adding kaolin clay, mixing and spray drying. Both catalysts were exchanged to a low $Na_2O$ level using the same procedure as in Example 15.

(b) The composition and microactivity results summarized in Table XIV at 0, 0.67 Wt.% show: (1) addition of the caustic leached calcined clay component enhances activity (with/without V), and (2) addition of the caustic leached calcined clay component does not significantly change the coke yield on a coke/kinetic conversion basis).

TABLE XIV

Effect of CLS Additive for Vanadium Tolerance

|  | Catalyst I | Catalyst II |
|---|---|---|
| Composition (Wt %) | 20% $SiO_2$ Sol 22% Calcined RE Y 58% Kaolin Clay | 20% $SiO_2$ Sol 22% Calcined RE Y 15% Caustic Leached Calcined Clay |
| Wt. % V (added before steaming) | 0.67 | 0.67 |
| Conversion (Vol. %) | 39.8 | 52.8 |
| $H_2$ (W %) | 0.15 | 0.33 |
| $H_2$/Kinetic Conversion | 0.23 | 0.29 |
| Coke (Wt %) | 1.42 | 2.67 |
| Coke/Kinetic Conversion | 2.15 | 2.39 |
| Wt. % V | 0 | 0 |
| Conversion (Vol. %) | 67.1 | 76.3 |
| $H_2$ (W %) | 0.035 | 0.063 |
| Coke (W %) | 3.8 | 4.4 |
| Coke/Kinetic Conversion | 1.86 | 1.37 |

Microactivity Test Conditions 500° C., 16 WHSV, 3 c/o on a West Texas Heavy Gas Oil after an 8 hour, 732° C., 100% steam deactivation.

(c) Physical properties for these samples are given in Table XV. The addition of the caustic leached clay additive causes no substantial change in density or attrition resistance, however surface area is significantly increased.

TABLE XV

Physical Properties of SiO₂ Sol Bound Caustic Leached Calcined Clay

|  | Catalyst I | Catalyst II |
|---|---|---|
| Composition (Wt %) | 20% SiO$_2$ Sol<br>22% Calcined RE Y<br>58% Kaolin Clay | 20% SiO$_2$ Sol<br>22% Calcined RE Y<br>15% Caustic Leached Calcined Clay<br>43% Kaolin Clay |
| Average Bulk Density/Compressed Density (g/cc) | 0.88/0.96 | 0.85/0.89 |
| Davison Index/Jersey Index | 6/0.5 | 4/0.5 |
| Pore Volume: N$_2$/H$_2$O (cc/g) | 0.05/.26 | 0.11/0.26 |
| Surface Area (m$^2$/g) | 122 | 188 |

EXAMPLE 18

This example shows the use of a silica sol bound CLS particle as a physical blend component.

(a) A milled slurry of 4.0 Kg (dry basis) CLS (prepared as in Example 15) was added to pH 3.0 silica sol (2.0 Kg SiO$_2$ basis) and then 2.0 of kaolin clay was added, the slurry was briefly mixed and spray dried. This sample was exchanged to low Na$_2$O by the same procedure as in Example 15.

(b) Physical properties and microactivity data are given in Table XVI.

TABLE XVI

Physical Properties and Microactivity Results on a 25% Silica Sol Bound 50% CLS Blend Component

|  | Blend Component |
|---|---|
| Composition (Wt %) | 25% SiO$_2$ Sol<br>25% Kaolin Clay<br>50% CLS |
| Physical Properties |  |
| Davison Index/Jersey Index | 7/0.6 |
| Surface Area (m$^2$/g) | 127 |
| N$_2$ Pore Volume (cc/g) | 0.16 |
| Average Bulk Density (g/cc) | 0.85 |
| Na$_2$O (Wt %) | 0.031 |
| Al$_2$O$_3$ (Wt %) | 49.17 |
| Microactivity (MA) |  |
| Conversion (Vol. %) | 54.9 |
| H$_2$, (%) | 0.17 |
| Coke, (Wt %) | 3.56 |

MA Conditions: 500° C., 16 WHSV, 3 c/o on a West Texas Heavy Gas Oil after an 8 hour, 732° C., 100% steam calcination (c) A blend was prepared using this particle (80% by weight) along with a particle containing 24% SiO$_2$ sol binder, 35% calcined rare earth Y, 41% kaolin clay (20% by weight in the blend).

(d) Microactivity results on the blend (Catalyst I), summarized in Table XVII, indicate the blend produced similar LCO, G+D, and 338° C.+bottoms to the SiO$_2$—MgO+CREY catalyst (Catalyst II) at significantly lower coke yield, and significantly higher LCO, G+D yields than a silica sol bound rare earth Y/kaolin catalyst (Catalyst III).

TABLE XVII

Microactivity Comparison Using a Silica Sol Bound CLS Particle as a Blend Component with Zeolite FCC Catalyst to Produce High LCO Yield With Good Coke Selectivity

|  | Catalyst I | Catalyst II | Catalyst III |
|---|---|---|---|
| Composition | Blend of<br>80% 25% SiO$_2$ Sol<br>25% Kaolin Clay<br>50% Caustic Leached Calcined Clay<br>20% 24% SiO$_2$ Sol<br>35% Calcined RE Y<br>41% Kaolin Clay | 66.9% SiO$_2$—MgO<br>4.5% Calcined RE Y<br>28.6% Kaolin Clay | 20% SiO$_2$ Sol<br>17% RE Y<br>63% Kaolin Clay |
| Conversion (Vol. %) | 63.8 | 63.6 | 65.7 |
| H$_2$ (W %) | 0.079 | 0.081 | 0.042 |
| Total C$_1$ + C$_2$ (W %) | 0.91 | 1.86 | 1.46 |
| Total C$_3$ (%) | 5.9 | 5.2 | 6.3 |
| Total C$_4$ (Wt %) | 11.3 | 8.2 | 7.9 |
| C$_5$+ Gaso. (%) | 58.4 | 57.9 | 57.2 |
| Light Cycle Oil (%) | 17.7 | 17.6 | 13.0 |
| Total Gasoline Distillate (%) | 76.1 | 75.6 | 70.3 |
| 640° C. + Bottoms, (%) | 18.5 | 18.8 | 21.3 |
| Coke (W % of Feed) | 2.0 | 2.5 | 5.6 |
| Coke/Kinetic Conversion | 1.14 | 1.43 | 2.92 |

Microactivity Test Conditions: 500° C., 16 WHSV, 3 c/o on WTHGO after an 8 hour, 732° C., 100% steam deactivation.

EXAMPLE 19

This example shows the good coke selectivity, octane enhancing capability and improved bottoms cracking of the SiO$_2$ sol bound ultrastable Y/caustic leached calcined clay combination.

(a) Table XVIII summarizes the physical properties of these catalysts. These catalysts were prepared by co-milling a 30% solids slurry containing the ultrastable Y and the CLS component, adding this to pH 3.0 silica sol, adding kaolin clay, mixing and spray drying.

(b) The exchange procedure on this series was modified from that in Example 15 in that some RE+$^3$ is incoporated. 1.0 Kg of the spray dried product for Catalysts I and II in Table XVIII were exchanged as follows: (1) slurry in 3.8 l 70° C. H$_2$O+filter; (2) Rinse on the filter 3 times with 1 l 3% (NH$_4$)$_2$SO$_4$; (3) reslurry in 3.0 l 70° C. H$_2$O and filter; (4) rinse on the filter 3 times 1.0 l 70°°C. H$_2$O; (5) reslurry in 3.0 l H$_2$O containing 31.2 grams mixed RECl$_3$ solution (30 Wt. % Re$_2$O$_3$) and aged for 20 minutes at 66° C. at pH 4.9–5.0 (adjust pH as required with 3% NH$_4$OH); (6) filter and rinse on the filter 3 times with 1.0 l 70° C. H$_2$O and oven dry overnight at 120° C.

Catalyst III in Table XVIII was prepared and exchanged in the same manner, except that the 91.3 grams RECl$_3$ solution was used for the rare earth exchange.

TABLE XVIII

Physical and Chemical Properties of SiO$_2$ Sol Bound Catalysts Containing Ultrastable Y and CLS

|  | Catalyst I | Catalyst II | Catalyst III |
|---|---|---|---|
| Composition (Wt %) | 20% SiO$_2$ Sol<br>25% Ultrastable Y<br>10% Caustic Leached Calcined Clay<br>45% Kaolin Clay | 20% SiO$_2$ Sol<br>25% Ultrastable Y<br>20% Caustic Leached Calcined Y | 20% SiO$_2$ Sol<br>17% Ultrastable Y<br>55% Kaolin Clay |
| Na$_2$O (Wt. %) | 0.17 | 0.17 | 0.41 |
| Al$_2$O$_3$ | 34.34 | 35.67 | 30.65 |
| SO$_4$ (Wt. %) | 0.20 | 0.16 | 0.37 |
| Re$_2$O$_3$ (Wt. %) | 1.22 | 1.13 | 4.73 |
| Surface Area (m$^2$/gm) | 206 | 209 | 150 |
| N$_2$ Pore Volume/ H$_2$O Pore Volume | .14/.32 | .13/.38 | .10/.20 |
| Average Bulk Density (g/cc) | 0.83 | 0.75 | 0.92 |
| Davison Index/ Jersey Index (g/cc) | 4/0.3 | 10/0.8 | 2/0.3 |

(c) Microactivity results summarized in Table XIX, indicate Catalyst I and II, the samples with the CLS component have improved bottoms (482° C.+) conversion, increased LCO and G+D, with no significant change in coke or gas yields.

TABLE XIX

Microactivity Results on SiO$_2$ Sol Bound CLS/Zeolite/Clay Catalysts

|  | Catalyst I | Catalyst II | Catalyst III |
|---|---|---|---|
| Composition (Wt %) | 20% SiO$_2$ Sol<br>25% Ultrastable Y<br>10% Caustic Leached Calcined Clay<br>45% Kaolin Clay | 20% SiO$_2$ Sol<br>25% Ultrastable Y<br>20% Caustic Leached Calcined Y<br>35% Kaolin Clay | 20% SiO$_2$ Sol<br>17% Ultrastable Y<br>55% Kaolin Clay |
| Conversion (Vol. %) | 65.5 | 73.2 | 67.1 |
| H$_2$ (W %) | 0.063 | 0.083 | 0.063 |
| Total C$_1$ + C$_2$ (W %) | 0.92 | 1.26 | 1.32 |
| Total C$_3$ (%) | 6.1 | 7.7 | 7.5 |
| Total C$_4$ (Wt %) | 11.0 | 13.6 | 12.6 |
| C$_5$+ Gaso. (%) | 60.6 | 65.4 | 59.1 |
| Light Cycle Oil (%) | 15.4 | 15.1 | 13.6 |
| Total Gasoline Distillate (%) | 76.0 | 80.5 | 72.7 |
| 338° C. + Bottoms, (%) | 19.1 | 11.7 | 19.3 |
| Coke (W % of Feed) | 1.5 | 2.0 | 2.1 |
| Coke/Kinetic Conversion | 0.79 | 0.73 | 1.03 |
| Total Conversion | 78.3 | 86.2 | 78.3 |
| 482° C. + COnv. | 92.1 | 96.2 | 88.6 |

Microactivity Test Conditions: 500° C., 16 WHSV, 3 c/o on a West Texas Heavy Gas Oil after an 8 hour, 732° C., 100% steam treatment.

(d) Table XX compares the second catalyst from Table XIX with a commerical cracking catalyst in a riser unit test on Gas Oil. The CLS/clay/ultrastable Y catalyst bound with SiO$_2$ sol compared to the commercial catalyst yields the following observations: (1) gasoline of increased octane; (2) significantly reduced coke yields; and (3) better bottoms conversion as indicated by API gravity and aniline point.

TABLE XX

Riser Pilot Unit Comparison of SiO₂ Sol Bound Catalyst with Commercial Catalyst

| | CLS/Zeolite/Clay Catalyst I | Catalyst II |
|---|---|---|
| Composition | 20% SiO₂ | Commercial |
| | 25% Ultrastable Y | |
| | 20% CLS | |
| | 35% Kaolin Clay | |
| Conversion (Vol %) | 70 | |
| H₂ (W %) | 0.08 | 0.15 |
| Total C₁ + C₂ (W %) | 1.7 | 1.7 |
| Total C₃ (%) | 8.5 | 7.9 |
| Total C₄ (%) | 12.1 | 11.5 |
| C₅⁺ Gasoline (%) | 62.5 | 63.0 |
| Research Octane Numbers | 91.2 | 89.4 |
| Motor Octane Numbers | 79.5 | 79.5 |
| Light Cycle Oil (V %) | 16.0 | 16.0 |
| Coke (W %) | 3.0 | 4.2 |
| HCO | | |
| API Gravity | 7.5 | 11.0 |
| Aniline Pt. | 130 | 145 |

Riser Unit Test Cond. 550° C., 8 seconds contact time, Sohio Gas Oil, 6 c/o, 75 WHSV, yields interpolated to 70% conversion
Deactivation: 12 Hrs., 827° C., 20% steam equilibrium

EXAMPLE 20

This example shows that combining a low level of rare earth exchange with a low level of ultrastable Y and a high level of CLS allows a dramatic decrease in the amount of zeolite used while maintaining activity and high olefin yields which implies enhanced gasoline octane. Table XXI gives the formulation of two silica sol bound catalysts prepared by the general method of Example 15. The sample with the caustic leached calcined clay was given a final rare earth exchange (16.9 g. mixed RECl₃ solution @ 30% RE₂O₃/900 g. spray dried product) while the sample with ultrastable Y alone was only (NH₄)₂SO₄ exchanged. The microactivity results set forth in Table XXI indicate the low rare earth exchanged CLS containing catalyst gave: (1) at least equal conversion; (2) no significant change in coke, gas yields; (3) increased G+D, gasoline and LCO, (4) reduced 338° C.+bottoms yields, and (5) at least equal gasoline octane as indicated by the high level of C₄=/Tot. C₄.

TABLE XXI

Microactivity Comparision of Ultrastable Y/CLS in SiO₂ Sol with Ultrastable Y alone

| | Catalyst I | Catalyst II |
|---|---|---|
| Composition (Wt %) | 20% SiO₂ Sol | 20% SiO₂ Sol |
| | 15% Ultrastable Y | 40% Ultrastable Y |
| | 40% CLS | 35% Kaolin Clay |
| | 20% Kaolin Clay | |
| Wt. % RE₂O₃ | 1.11 | 0.0 |
| Conversion (Vol %) | 64.5 | 60.0 |
| H₂ (W %) | 0.096 | 0.094 |
| Total C₁ + C₂ (W %) | 1.02 | 0.99 |
| Total C₄ (%) | 11.5 | 11.5 |
| C₄=/Tot. C₄ | 0.55 | 0.49 |
| C₅⁺ Gasoline (%) | 58.7 | 53.0 |
| Light Cycle Oil (%) | 15.8 | 13.7 |
| Total Gasoline Distillate (%) | 74.4 | 66.7 |
| 338° C. + Bottoms (%) | 19.8 | 26.4 |
| Coke (W % Feed)) | 1.9 | 1.5 |
| Coke/Kinetic Conv. | 1.05 | 1.00 |
| Total Conversion | 78.5 | 70.8 |
| % 482° C. + Conv. | 92.8 | 86.4 |

Ma Conditions: 500° C., 16 WHSV, 3 c/o, on a West Texas Heavy Gas Oil after an 8 hour, 732° C., 100% steam treatment.

The above examples clearly indicate that valuable hydrocarbon processing catalysts and catalyst supports may be obtained using the teachings of the present invention.

We claim:

1. A method for cracking hydrocarbons which comprises reacting a hydrocarbon feedstock under catalytic cracking conditions in the presence of a cracking catalyst composition which comprises a crystalline zeolite, an inorganic oxide matrix, and a finely divided, calcined caustic leached aluminum silicon spinel/mullite component having a silica to alumina mole ratio of from about 0.5 to 1.7 and an acid site retention of from about 70 to 95 percent after treating at 1350° F. in the presence of saturated steam and an X-ray diffraction pattern as set forth in Tables A or B.

2. The method of claim 1 wherein said hydrocarbon feedstock is a residual feedstock which contains from about 5 to 200 ppm of a metal selected from the group consisting of vanadium, nickel and mixtures thereof.

3. The method of claim 1 in which the spinel/mullite component has a surface area of about 150 to 350 m²/g, and a total pore volume of 0.30 to 1.00 cc/g.

4. The method of claim 1 wherein said spinel/mullite component has a particle size of from about 0.05 to 20 microns and is incorporated into the matrix of said catalyst as a separate, particulate component.

5. The method of claim 1 wherein said catalyst contains from about 5 to 50 percent by weight of said spinel/mullite component.

6. The method of claim 1 wherein said catalyst contains from about 5 to 50 weight percent of a zeolite selected from the group consisting of ultrastable Y and rare earth exchanged Y zeolites.

7. The method of claim 1 wherein said catalyst contains from about 10 to 20 weight percent of a binder selected from the group consisting of silica sol, alumina sol, and silica-alumina hydrogels.

8. The method of claim 1 wherein said zeolite is ultrastable Y zeolite and said catalyst is exchanged with rare earth ions.

9. The method of claim 8 wherein said catalyst contains from about 0.5 to 3 weight percent RE₂O₃.

10. The method of claim 1 wherein the said spinel/mullite component has a microspheroidal particle shape, having the diameter of from about 20 to 200 microns, and is mixed with said catalyst as a separate particulate component.

* * * * *